(12) United States Patent
Blanchard

(10) Patent No.: US 10,431,128 B2
(45) Date of Patent: Oct. 1, 2019

(54) PRESSURE REGULATOR WITH IDENTIFICATION DEVICE

(71) Applicant: Marshall Excelsior Co., Marshall, MI (US)

(72) Inventor: Frederick W. Blanchard, Battle Creek, MI (US)

(73) Assignee: MARSHALL EXCELSIOR CO., Marshall, MI (US)

(*) Notice: Subject to any disclaimer, the term of this patent is extended or adjusted under 35 U.S.C. 154(b) by 53 days.

(21) Appl. No.: 15/170,324

(22) Filed: Jun. 1, 2016

(65) Prior Publication Data

US 2016/0275825 A1    Sep. 22, 2016

Related U.S. Application Data

(63) Continuation of application No. 14/294,366, filed on Jun. 3, 2014, now Pat. No. 9,400,074.

(51) Int. Cl.
*G09F 3/10*     (2006.01)
*F16L 55/00*    (2006.01)
(Continued)

(52) U.S. Cl.
CPC .............. *G09F 3/10* (2013.01); *B21D 39/00* (2013.01); *F16L 55/00* (2013.01); *G01M 3/2876* (2013.01);
(Continued)

(58) Field of Classification Search
CPC .............. G09F 3/0288; G09F 3/0295; G09F 2003/0219; G09F 3/10; Y10T 428/1495; F17C 2205/0338
See application file for complete search history.

(56) References Cited

U.S. PATENT DOCUMENTS 3,511,266 A * 5/1970 Phlipot ............ F16K 31/52491
                                                    137/484.4
4,526,404 A   7/1985 Vazquez
(Continued)

FOREIGN PATENT DOCUMENTS

AU       36223/89 A    1/1990
AU       746344 B1    4/2002
(Continued)

OTHER PUBLICATIONS

English language abstract and machine-assisted English language translation of FR 2 706 214 B1 extracted from www.espacenet.com on Jun. 7, 2016; 5 pages.

(Continued)

*Primary Examiner* — Mary E McManmon
*Assistant Examiner* — Nicole Gardner
(74) *Attorney, Agent, or Firm* — Howard & Howard Attorneys PLLC

(57) ABSTRACT

A pressure regulator for installing in a fluid flow system. The pressure regulator comprises a body and an identification device coupled to the body. The identification device has a first portion with first identification information and a second portion with second identification information. The second portion of the identification device is separated from the pressure regulator while the first portion of the identification device remains coupled to the pressure regulator. The second portion of the identification device is then affixed to a surface, such as a form.

6 Claims, 4 Drawing Sheets

(51) Int. Cl.
G01M 3/28 (2006.01)
B21D 39/00 (2006.01)
G05D 16/00 (2006.01)
B23P 19/10 (2006.01)
G09F 3/02 (2006.01)
G09F 3/00 (2006.01)

(52) U.S. Cl.
CPC ............ *G05D 16/00* (2013.01); *B23P 19/10* (2013.01); *F16L 2201/30* (2013.01); *F16L 2201/60* (2013.01); *F17C 2205/0332* (2013.01); *F17C 2205/0338* (2013.01); *F17C 2205/05* (2013.01); *F17C 2205/052* (2013.01); *F17C 2205/054* (2013.01); *F17C 2205/058* (2013.01); *F17C 2221/033* (2013.01); *F17C 2221/035* (2013.01); *F17C 2270/07* (2013.01); *G09F 3/0288* (2013.01); *G09F 2003/023* (2013.01); *G09F 2003/0208* (2013.01); *G09F 2003/0219* (2013.01); *Y10T 29/4978* (2015.01)

(56) References Cited

U.S. PATENT DOCUMENTS

| | | |
|---|---|---|
| 4,726,131 A | 2/1988 | Cass |
| 4,916,938 A | 4/1990 | Aikin et al. |
| 5,172,936 A | 12/1992 | Sullivan et al. |
| 5,267,899 A | 12/1993 | Longtin |
| 5,271,642 A | 12/1993 | Jahier |
| 5,329,713 A | 7/1994 | Lundell |
| 5,348,780 A | 9/1994 | Boggs et al. |
| 5,829,789 A | 11/1998 | Treleaven et al. |
| 5,900,610 A | 5/1999 | Kelly, Jr. |
| 6,035,568 A | 3/2000 | Grosskopf et al. |
| 6,058,636 A * | 5/2000 | Colkmire ........... B65D 55/0818 215/232 |
| 6,364,990 B1 | 4/2002 | Grosskopf et al. |
| 7,514,131 B2 | 4/2009 | Funato et al. |
| 7,909,239 B2 | 3/2011 | Grant et al. |
| RE42,531 E | 7/2011 | Brown et al. |
| 8,152,063 B1 | 4/2012 | Grant et al. |
| 2002/0014266 A1 | 2/2002 | Zaiser |
| 2002/0089173 A1 | 7/2002 | Reidy |
| 2009/0289448 A1 | 11/2009 | Sample |
| 2010/0064778 A1 | 3/2010 | Simpson |
| 2010/0095744 A1 | 4/2010 | Johnson |
| 2012/0148782 A1 | 6/2012 | Watanabe |
| 2012/0246986 A1 | 10/2012 | Brennan |

FOREIGN PATENT DOCUMENTS

| | | |
|---|---|---|
| EP | 0 283 064 B1 | 4/1992 |
| FR | 2 706 214 B1 | 7/1995 |
| WO | WO 2003 054837 A1 | 7/2003 |

OTHER PUBLICATIONS

GasCheck—Gas System Check, Form No. PRC 000000, Propane Exceptional Energy, PERC 2007, published at least before Jun. 3, 2014; 1 page.

\* cited by examiner

Regulator Check

| Type | Manufacturer | Date/Model | Vent Position/ Protection | Flow Pressure | Lock-Up Pressure |
|---|---|---|---|---|---|
| TYPE : XXXX-1000 ORIFICE : X" SPG RANGE : X-X WC MAX. INLET : X PSI INTERNAL RELIEF  S/N: 000017 SECOND STAGE | | | | | |
| | | | | | |
| | | | | | |

Piping Check

| Materials | Size | Cover/Protection |
|---|---|---|
| | | |
| | | |
| | | |
| | | |

Pressure Test (If Applicable)

| Start Pressure | End Pressure | Time Held | Pressure Held | Y N |
|---|---|---|---|---|
| | | | Work Order | Y N |

System Leak Check

| Start Pressure | End Pressure | Time Held | Pressure Held | Y N |
|---|---|---|---|---|
| | | | Work Order | Y N |

Container Check

| Size | Serial # | Manufacturer | Requalification Date (Cylinders Only) | Location | Container Condition | Relief Valve | Fittings Leak Check |
|---|---|---|---|---|---|---|---|
| | | | | | | | |
| | | | | | | | |
| | | | | | | | |

Account number _____ Invoice Number _____ Date ___/___/___
Name _____ Company/Branch _____
Address _____ Call Taken By _____
City _____ State ____ Zip _____ Telephone (Work) _____ (Home) _____

<u>Safety Information Supplied:</u> _____

<u>Comments:</u> Please note all repairs and corrections made along with any recommended actions.
_____
_____
_____

FIG. 4

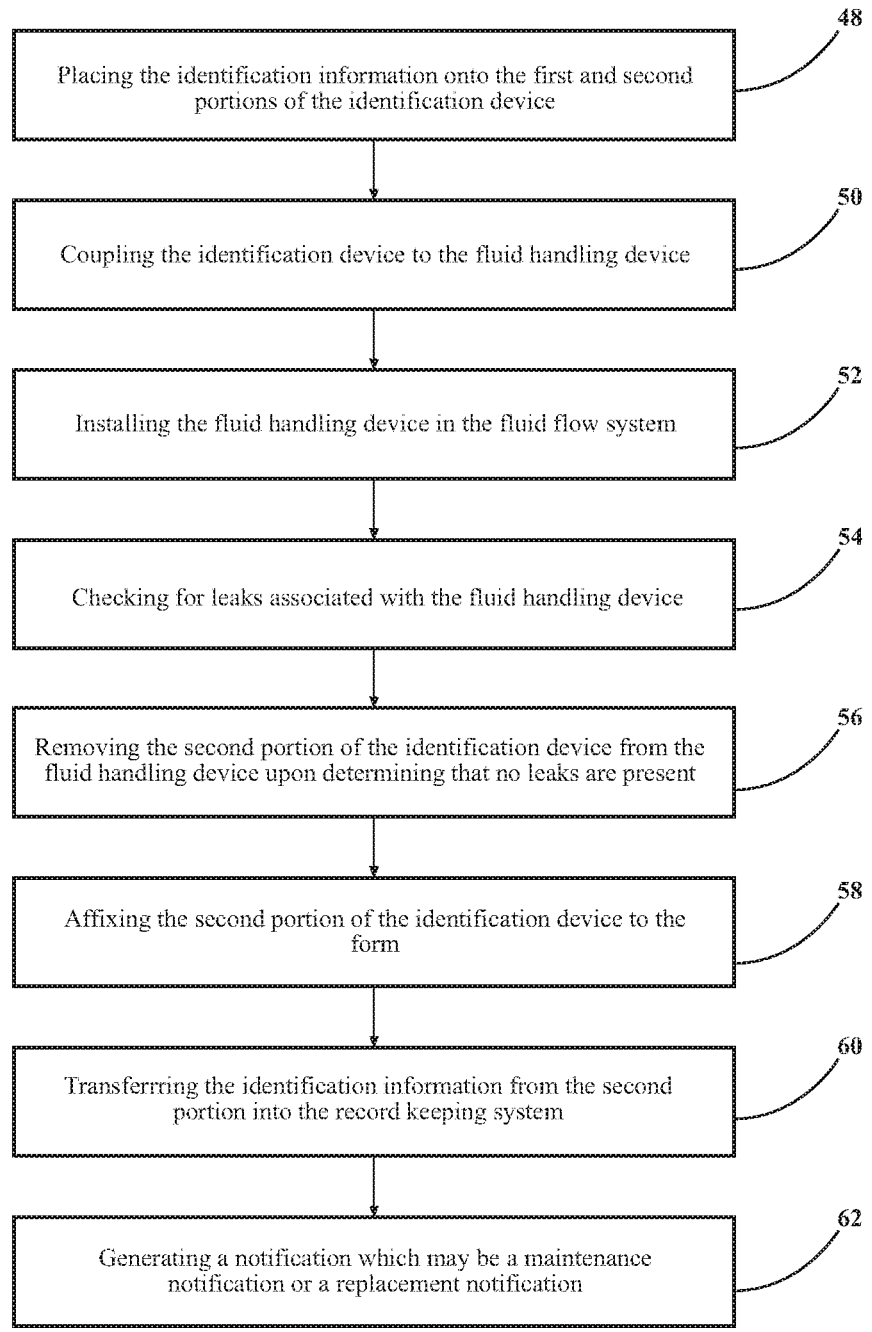

PRESSURE REGULATOR WITH IDENTIFICATION DEVICE

RELATED APPLICATIONS

This application is a continuation of U.S. patent application Ser. No. 14/294,366, filed on Jun. 3, 2014, the entire contents of which are hereby incorporated by reference.

TECHNICAL FIELD

The present invention generally relates to a pressure regulator with an identification device.

BACKGROUND

There is a desire within industries utilizing fluid handling devices mounted in a fluid flow system to improve the method of documenting installation of the fluid handling device. A current method of documenting installation of the fluid handling device requires an installer to duplicate information from the fluid handling device onto a form by writing the information on the form. The installer or a third party transfers the duplicated information on the form into a record keeping system. The record keeping system uses the information to schedule maintenance for the fluid handling device or replacement of the fluid handling device. One problem with this method is the amount of time required for the installer to duplicate the information on the form by handwriting. An additional problem with this method is the quality of the installer's writing may be poor and may be interpreted incorrectly. A further problem with this method is the installer may not duplicate all of the information or may incorrectly duplicate the information.

There remains an opportunity to develop a method of documenting the installation of the fluid handling device in the fluid flow system that simplifies the process of the installer duplicating information from the fluid handling device.

SUMMARY

In one embodiment, a pressure regulator for installing in a fluid flow system is provided. The pressure regulator comprises a body and an identification device coupled to the body. The identification device has a first portion with first identification information and a second portion with second identification information. At least a portion of the first identification information is the same as the second identification information. The second portion of the identification device is configured to be separated from the first portion while the first portion of the identification device remains coupled to the body. The second portion is configured to be affixed to a surface after the second portion is separated from the first portion.

In some embodiments, the first and second identification information is identical. In other embodiments, the first and second identification information is different.

Advantageously, in some embodiments, since the second portion of the identification device includes the second identification information required on a form the amount of time needed to document installation is reduced by virtue of an installer simply affixing the second portion onto the form, without needing to duplicate any information by hand.

BRIEF DESCRIPTION OF THE DRAWINGS

Other advantages of the present invention will be readily appreciated, as the same becomes better understood by reference to the following detailed description when considered in connection with the accompanying drawings.

FIG. 4 is an example of a form with the second portion of the identification device affixed to the form; and FIG. 5 is a flow chart of the method of installing the fluid handling device in the fluid flow system using the form and a record keeping system.

DETAILED DESCRIPTION

Figure 1:
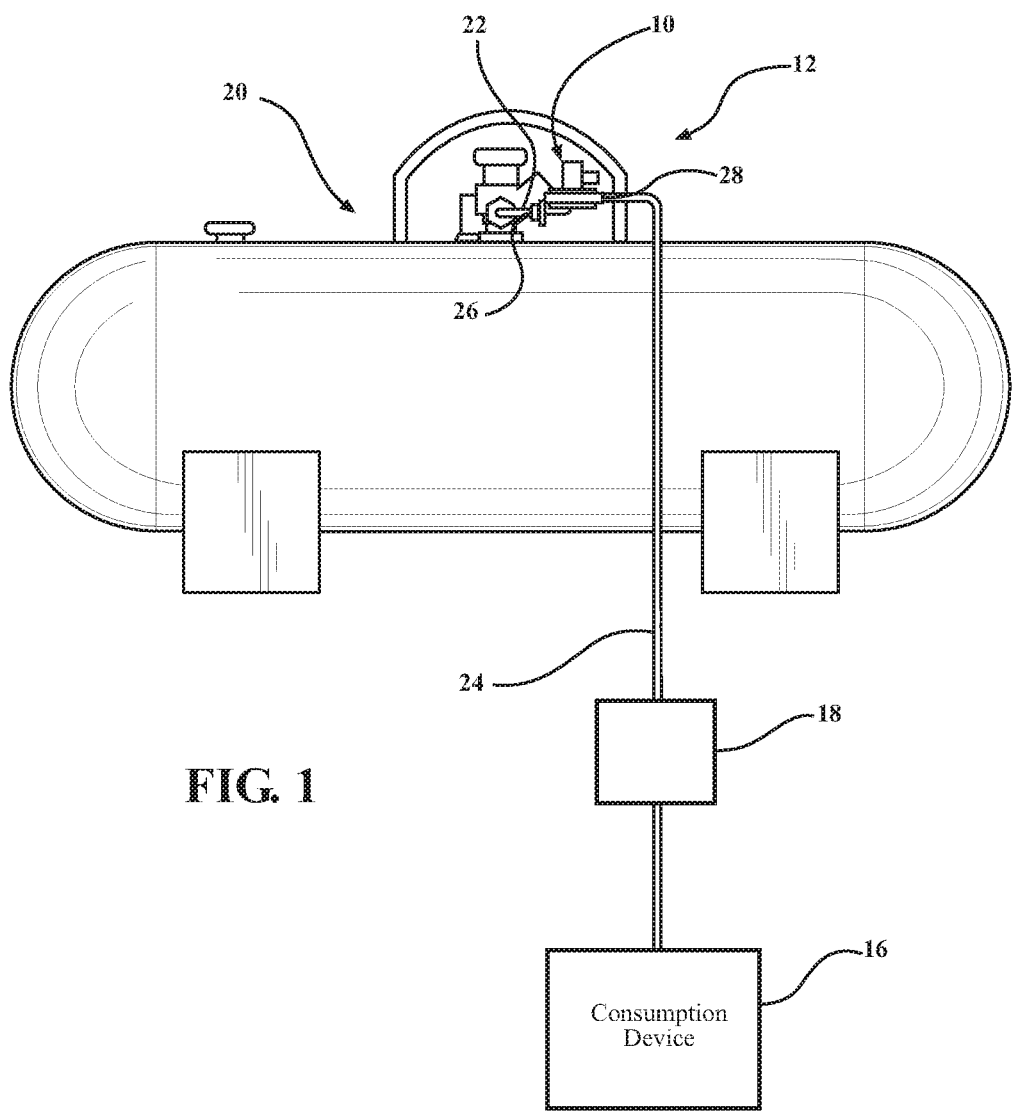
FIG. 1 is a schematic view of a fluid flow system including a fluid handling device.

Referring to the Figures wherein like numerals indicate like or corresponding parts throughout the several views, a method of documenting installation of a fluid handling device 10 in a fluid flow system 12 using a form 14 and a record keeping system (not shown) is disclosed. As shown in FIG. 1, the fluid flow system 12 is used to distribute a fluid to a consumption device 16. Examples of consumption devices 16 include a furnace or a gas stove for a residential building. In one embodiment, the fluid flow system 12 is further defined as a propane system and the fluid handling device 10 is a pressure regulator. In other embodiments, the fluid handling device 10 may be a valve or fitting and/or the fluid may be natural gas or other fluids. It is to also be appreciated that the fluid flow system 12 may include an additional device 18 between the fluid handling device 10 and the consumption device 16, such as a secondary pressure regulator.

A fluid delivery system 20 provides the fluid to the fluid flow system 12. Examples of the fluid delivery system 20 include a storage tank or a utility gas system. The fluid flow system 12 includes a first conduit 22 coupled to the fluid delivery system 20. Additionally, the fluid flow system 12 includes a second conduit 24 coupled to the consumption device 16. The fluid handling device 10 is coupled to the fluid flow system 12.

As shown in FIG. 1, the fluid handling device 10 has an inlet 26 and an outlet 28 spaced from the inlet 26. The inlet 26 of the fluid handling device 10 is coupled to the first conduit 22 and the outlet 28 of the fluid handling device 10 is coupled to the second conduit 24. The fluid handling device 10 places the first conduit 22 in fluid communication with the second conduit 24. Specifically, the fluid handling device 10 places the consumption device 16 in fluid communication with the fluid delivery system 20.

In one embodiment, the fluid from the fluid delivery system 20 is provided at a higher pressure than the consumption device 16 requires. The fluid handling device 10, e.g., the pressure regulator in this embodiment, reduces the pressure of the fluid in the fluid flow system 12 to ensure the fluid is delivered to the consumption device 16 within a specific pressure range. One such pressure regulator is shown in U.S. patent application Ser. No. 14/207,774 filed on Mar. 13, 2014, entitled, "Pressure Regulator", hereby incorporated by reference.

An identification device 30 is coupled to the fluid handling device 10. In the embodiment shown, the identification device 30 is further defined as a label device coupled to the fluid handling device 10. However, it is to be appreciated that the identification device 30 can be any suitable alternative, such as, a tag.

Figure 3:
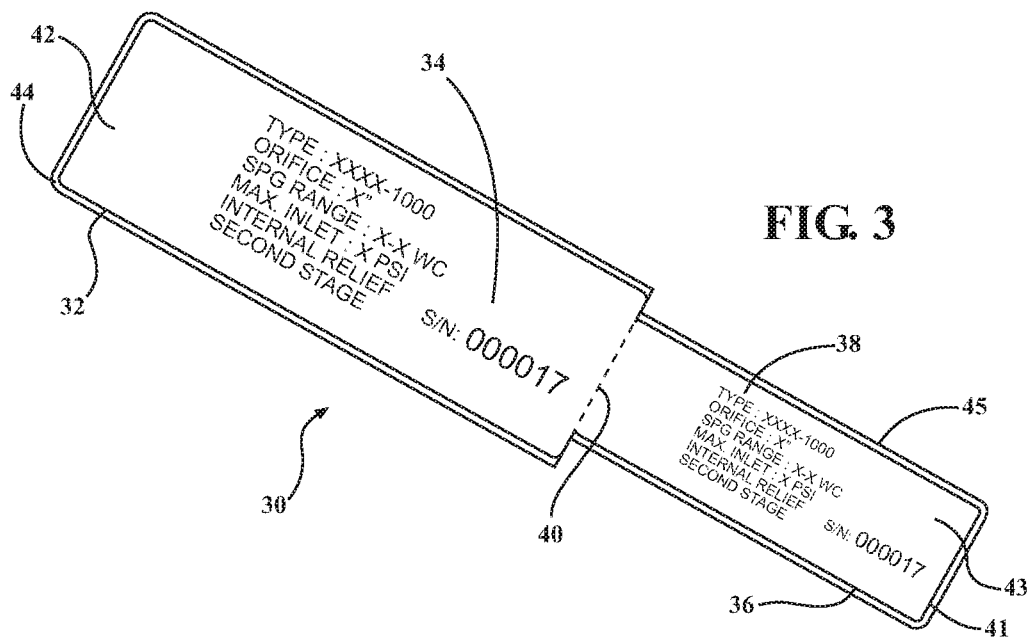
FIG. 3 is a perspective view of the identification device.

As shown in FIG. 3, the identification device 30 has identification information. In the embodiment shown, the identification device 30 has a first portion 32 with first identification information 34 and a second portion 36 with second identification information 38. The first portion 32 is further defined as a first label and the second portion 36 is further defined as a second label. However, it is to be appreciated that the first and second portions 32, 36 could be two separate label portions.

The identification device 30 has a perforation 40 between the first and second portions 32, 36. The first and second portions 32, 36 can be separated from each other along the at least one perforation 40. However, it is to be appreciated that the first and second portions 32, 36 may be separated by any suitable alternative means, such as, a score line.

Figure 2:
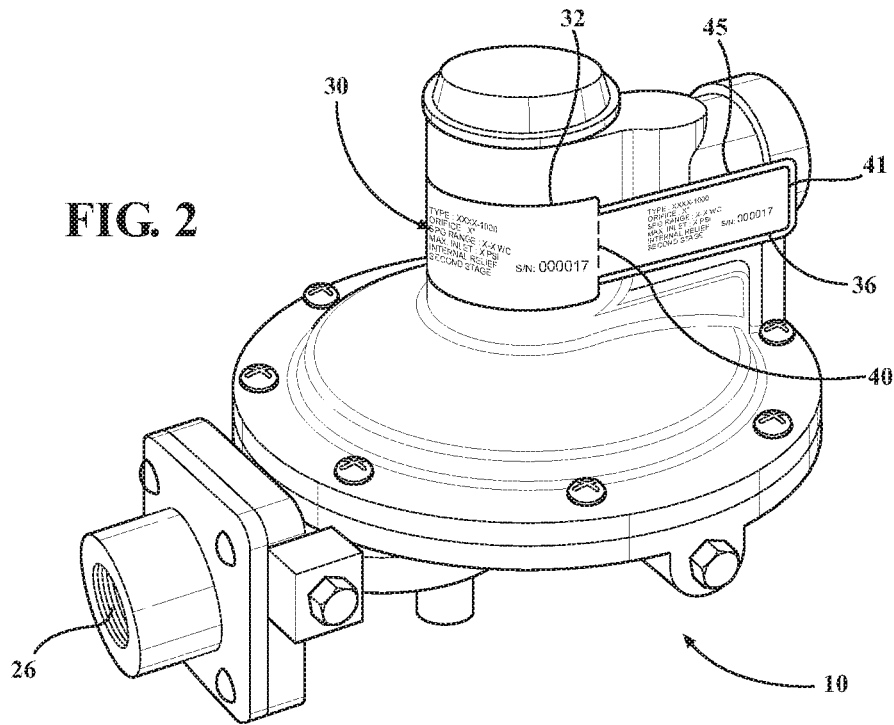
FIG. 2 is a perspective view of the fluid handling device including an identification device.

Referring to FIG. 2, the identification device 30 is coupled to the fluid handling device 10. More specifically, the first portion 32 is fixed to the fluid handling device 10 while the second portion 36 is detached from the fluid handling device 10, yet still coupled to the fluid handling device 10 by virtue of being coupled to the first portion 32. In other words, the second portion 36 freely hangs off the fluid handling device 10 while the first portion 32 is affixed to the fluid handling device 10. The second portion 36 freely hangs from the perforation 40 to a free end 41 of the second portion 36. In the embodiment shown, the second portion 36 of the identification device 30 is separable from the fluid handling device 10 while the first portion 32 of the identification device 30 remains coupled to the fluid handling device 10. More specifically, the second label is separable from the first label while the first label remains affixed to the fluid handling device 10.

As shown in the FIG. 3, the first and second portions 32, 36 each have an identification layer 42, 43 on which the first and second identification information 34, 38 is printed. Although not shown in the figures, each of the first and second portions 32, 36 have an adhesive layer (not shown) disposed on an underside of the identification layer 42, 43. The adhesive layer of the first portion 32 retains the identification device 30 to the fluid handling device 10. However, it is to be appreciated that the identification device 30 may be coupled to the fluid handling device 10 by any suitable alternative means, such as, wire or tape. Further, it is to be appreciated that the identification device 30 may include a single identification layer 42 and a single adhesive layer with the first and second identification information 34, 38 printed on the single layers.

As shown in FIG. 3, a backing 44, 45 is disposed on and removably coupled to each of the identification layers 42, 43 of the first and second portions 32, 36. The backings 44, 45 are larger than the identification layers 42, 43 with the backings 44, 45 extending past the identification layers 42, 43 such that the backings 44, 45 can be easily removed from the identification layers 42, 43. Further, it is to be appreciated that a single backing may be disposed on and removably coupled to the identification device 30.

As shown in FIG. 3, the first and second identification information 34, 38, includes information relating to a valve type, an orifice size, a spg (spring) range, a maximum inlet pressure, and a part number or serial number (S/N). In this embodiment, the first identification information 34 on the first portion 32 is identical to the second identification information 38 on the second portion 36. However, it is to be appreciated that any other suitable information could be included with the first identification information 34 and/or the second identification information 38, such as, a production date (manufacture date) or a lot number. The first and second identification information 34, 38 is printed on the first and second portions 32, 36. However, it is to be appreciated that the first and second identification information 34, 38 could be placed on the identification device 30 by any suitable alternative, such as, on a barcode or by handwriting the first and second identification information 34, 38 on the identification device 30 prior to installation.

As shown in FIG. 4, the form 14 contains additional information pertaining to the installation and maintenance of the fluid handling device 10 and information pertaining to the installation and maintenance of the fluid flow system 12. The form 14 includes a designated area or space 46 (denoted by dashed lines in FIG. 4) for the second portion 36 of the identification device 30 to be coupled to the form 14. However, it is to be appreciated that the form 14 may contain any suitable additional information, such as, information pertaining to the fluid delivery system 20.

Although not specifically shown in the Figures, once completed, the form 14 is transported to a location remote from the fluid flow system 12, such as a company office, service department, etc. where the information is entered into the record keeping system. The record keeping system is further defined as a computer system (not shown). However, it is to be appreciated the record keeping system may be any suitable alternative, such as, a paper filing system.

The second identification information 38 pertaining to the fluid handling device 10 and the additional information on the form 14 are transferred to the record keeping system. Specifically, the second identification information 38 and the additional information on the form 14 are typed into the record keeping system. However, it is to be appreciated that the second identification information 38 and the additional information on the form 14 may be transferred by any suitable alternative, such as, by scanning the barcode or by using radio-frequency electromagnetic fields (RFID).

The record keeping system generates a notification based upon the second identification information 38 in the record keeping system for the fluid handling device 10. The record keeping system includes a computer program for calculating when the notification for the fluid handling device 10 should be given. However, it is to be appreciated that the maintenance notification could be generated manually.

The notification may be one of a maintenance notification or a replacement notification. The maintenance notification may be a reminder for the utility provider to periodically inspect the fluid handling device 10 for leaks. The replacement notification may be a reminder for the utility provider to replace the fluid handling device 10.

The record keeping system generates the notification following a predetermined time period after installing the fluid handling device 10 in the fluid flow system 12 or following a predetermined time period after another date, such as the date of manufacture of the fluid handling device 10. Specifically, the notification is based upon the second identification information 38 and the installation date or manufacture date from the form 14 transferred to the computer system.

The method of documenting installation of the fluid handling device 10 in the fluid flow system 12 using the form 14 and the record keeping system is shown in FIG. 5. In step 48, the first and second identification information 34, 38 is placed onto the first and second portions 32, 36 of the identification device 30. In the embodiment shown, information relating to the fluid handling device specifications and a part number are placed onto the first and second portions 32, 36 of the identification device 30, e.g., by printing the first and second identification information 34, 38 on the identification layers 42, 43. A manufacturer of the fluid handling device 10 places the first and second identification information 34, 38 onto the first and second portions 32, 36. However, it is to be appreciated that placing the first and second identification information 34, 38 onto the first and second portions 32, 36 of the identification device 30 may be performed by an alternative party, such as a gas utility provider.

In step 50, the identification device 30 is coupled to the fluid handling device 10. In the embodiment shown, the first portion 32 of the identification device 30 is fixed to the fluid handling device 10 with the second portion 36 of the identification device 30 detached from the fluid handling device 10. The backing 45 on the first portion 32 is removed to expose the adhesive layer of the first portion 32. The first portion 32 is then placed on the fluid handling device 10 and the adhesive layer bonds to the fluid handling device 10 to retain the first portion 32 of the identification device 30 on the fluid handling device 10. The backing 45 on the second portion 36 remains on the second portion 36 of the identification device 30 while the second portion 36 of the identification device 30 hangs freely off the fluid handling device 10. The second portion 36 of the identification device 30 may abut the fluid handling device 10 in other embodiments.

The manufacturer of the fluid handling device 10 couples the identification device 30 to the fluid handling device 10 during manufacture. However, it is to be appreciated that coupling the identification device 30 to the fluid handling device 10 may be performed by an alternative party, such as, a gas utility provider.

In step 52, the fluid handling device 10 is installed in the fluid flow system 12. Installing the fluid handling device 10 in the fluid flow system 12 is performed by a gas utility provider. However, it should be appreciated that the fluid handling device 10 may be installed in the fluid flow system 12 by any alternative suitable party, such as, a third party installation company.

Installing the fluid handling device 10 in the fluid flow system 12 includes coupling the inlet 26 of the fluid handling device 10 to the first conduit 22 of the fluid flow system 12 and coupling the outlet 28 of the fluid handling device 10 to the second conduit 24 of the fluid flow system 12.

In step 54 the fluid flow system 12 is checked for leaks associated with the fluid handling device 10 installed in the fluid flow system 12. An example of checking for leaks is a pressure drop test. A pressure gauge (not shown) is coupled to and in fluid communication with the fluid flow system 12. The installer pressurizes the fluid flow system 12 and monitors the pressure gauge for a set period of time to check for pressure drops indicating a leak. However, it is to be appreciated that some amount of leak or pressure drop may be acceptable. In some embodiments, the fluid handling device 10 includes a leak check port (not shown) in which a pressure gauge can be inserted to check for leaks. The leak check port is in fluid communication with the fluid flow system 12 and is internally threaded to receive external threads of the pressure gauge.

In step 56, the second portion 36 of the identification device 30 is separated from the fluid handling device 10 while the first portion 32 of the identification device 30 remains coupled to the fluid handling device 10. The installer separates the second portion 36 along with the corresponding backing 45 from the first portion 32. In other embodiments, the installer may separate the identification layer 43 of the second portion 36 and leave the backing 45 from the second portion 36 attached to the first portion 32.

In further embodiments, the backing 45 of the second portion 36 may be separately affixed to the fluid handling device 10 such that the second portion 36 is not hanging freely off of the fluid handling device 10 but instead attached to the fluid handling device 10 alongside the first portion 32 by virtue of the backing 45 being affixed to the fluid handling device 10. In this embodiment, the second portion 36 is peeled off from its backing 45, which remains adhered to the fluid handling device 10, in order to separate the second portion 36 from the fluid handling device 10.

In the embodiment shown, separating the second portion 36 from the fluid handling device 10 includes tearing the identification device 30 between the first and second portions 32, 36. Specifically, the installer tears the identification device 30 along the perforation 40 between the first and second portions 32, 36.

In other embodiments, the first and second portions 32, 36 may be separate and spaced from one another on the fluid handling device 10. For instance, the second portion 36 may be a separate label or separate identification device (not shown) with its own backing adhered to the fluid handling device 10 while spaced from the first portion 32. In this embodiment, the installer simply peels the separate label from the backing in order to separate the label from the fluid handling device 10.

In step 58, the second portion 36 of the identification device 30 is affixed to the form 14. Specifically, the installer places the second portion 36 of the identification device 30 within the designated area 46 of the form 14.

Affixing the second portion 36 of the identification device 30 to the form 14 includes removing the backing 45 on the second portion 36 to expose the adhesive layer before affixing the second portion 36 of the identification device 30 to the form 14. The installer removes the backing 45 on the second portion 36 to expose the adhesive layer of the second portion 36. The installer places the second portion 36 on the form 14 and the adhesive layer bonds to the form 14 to retain the second portion 36 of the identification device 30 on the form 14.

A date of installing the fluid handling device 10 in the fluid flow system 12 and a location of the fluid handling device 10/fluid flow system 12 are also recorded on the form 14. The location may be an address or other location information such as GPS coordinates or the like. The installer fills in the additional information on the form 14 to transfer into the record keeping system at a later time. Specifically, the installer writes the additional information onto the form 14 by hand.

In step 60, the second identification information 38 from the second portion 36 of the identification device 30 affixed to the form 14 is transferred into the record keeping system. The installer or other party transfers the second identification information 38 from the second portion 36 of the identification device 30 into the computer system of the record keeping system. Specifically, the installer or other party types the second identification information 38 from the second portion 36 of the identification device 30 into the computer program of the computer system.

Transferring the second identification information 38 from the second portion 36 of the identification device 30 affixed to the form 14 into the record keeping system further includes transferring the date of installing the fluid handling device 10 in the fluid flow system 12 and the location of the fluid flow system 12. Specifically, the installer or other party types the additional information including the installation date from the form 14 into the computer program of the computer system.

In step 62, the notification is generated based upon the second identification information 38 in the record keeping system for the fluid handling device 10. Generating the notification is further based upon a predetermined time period after installing the fluid handling device 10 in the fluid flow system 12 or a predetermined time period after a date of manufacture of the fluid handling device 10, such as after a period of 5 years or 25 years has passed after installation or after the date of manufacture. The maintenance notification or replacement notification may be delivered in any suitable means, such as, an email or program notification. The maintenance notification may correspond to a warranty period for the particular manufacturer and the replacement notification may relate to a recommended service life.

Several embodiments of the present invention have been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims.

What is claimed is:

1. A pressure regulator for installing in a fluid flow system, said pressure regulator comprising:
   a pressure regulator body having an inlet and an outlet spaced from said inlet, said pressure regulator body having a body portion of a first diameter and a neck portion extending from said body portion of a second diameter being smaller than said first diameter, said neck portion having an arcuate portion; and
   an identification device coupled to said pressure regulator body, said identification device having a first portion with first identification information affixed circumferentially to said arcuate portion and a second portion with second identification information freely hanging off said pressure regulator body and tangentially relative to said arcuate portion, wherein at least a portion of said first identification information is the same as said second identification information,
   said second portion of said identification device being configured to be separated from said first portion while said first portion of said identification device remains coupled to said pressure regulator body, wherein said second portion is configured to be affixed to a surface after said second portion is separated from said first portion.

2. The pressure regulator as set forth in claim 1, wherein said identification device comprises a perforation between said first portion and said second portion.

3. The pressure regulator as set forth in claim 1, wherein said identification device comprises a backing and an adhesive layer with said backing being removably adhered to said second portion via said adhesive layer.

4. The pressure regulator as set forth in claim 1, wherein said first portion comprises a first label and said second portion comprises a second label.

5. The pressure regulator as set forth in claim 1, wherein said first information is identical to said second information.

6. The pressure regulator as set forth in claim 5, wherein said first information and said second information comprises valve type, spring range, and manufacture date.

* * * * *